United States Patent [19]
Lister

[11] 3,871,713
[45] Mar. 18, 1975

[54] BRAKING SYSTEM FOR VEHICLES HAVING SPEED CONTROLLED PROPORTIONAL BRAKING FOR FRONT AND REAR WHEELS

[76] Inventor: Paul M. Lister, 1028 S. W. Taylor, Portland, Oreg. 97205

[22] Filed: Apr. 27, 1973

[21] Appl. No.: 355,286

Related U.S. Application Data

[63] Continuation-in-part of Ser. No. 144,156, May 17, 1971, abandoned.

[52] U.S. Cl............. 303/6 C, 188/181 A, 188/349, 303/21 F, 303/24 F
[51] Int. Cl............................ B60t 8/06, B60t 8/18
[58] Field of Search............. 303/6 C, 6 R, 7, 8, 13, 303/21 F, 24 R, 24 A, 24 C, 24 F, 15, 20, 10; 188/345, 349, 180, 181 A

[56] References Cited
UNITED STATES PATENTS
3,159,729  12/1964  Stelzer .............................. 303/6 C
3,252,740  5/1966   Stelzer .............................. 303/24 F
3,384,423  5/1968   Cumming ........................... 303/6 C
3,588,191  6/1971   Atkin et al. ........................ 303/21 F Primary Examiner—Trygve M. Blix
Assistant Examiner—D. C. Butler
Attorney, Agent, or Firm—Eugene M. Eckelman

[57] ABSTRACT

A vehicle braking system employing proportional braking pressure below skid point for front and rear wheels according to the speed of the vehicle and prior to braking. To accomplish the invention, brake control mechanism is provided in the system for each of the front and rear braking member such that in general the faster the vehicle travels, the greater will be the braking force available to the front wheels and the lesser proportionately will be the braking force available to the rear wheels. The control mechanism mentioned may be operated hydraulically, electrically, or mechanically. The present system also includes a regulator for a central mechanism to vary the proportional braking according to road or other conditions, and further includes a control assembly operating in addition to the speed proportioning system and being driven by decelerating inertia forces of the vehicle.

7 Claims, 6 Drawing Figures

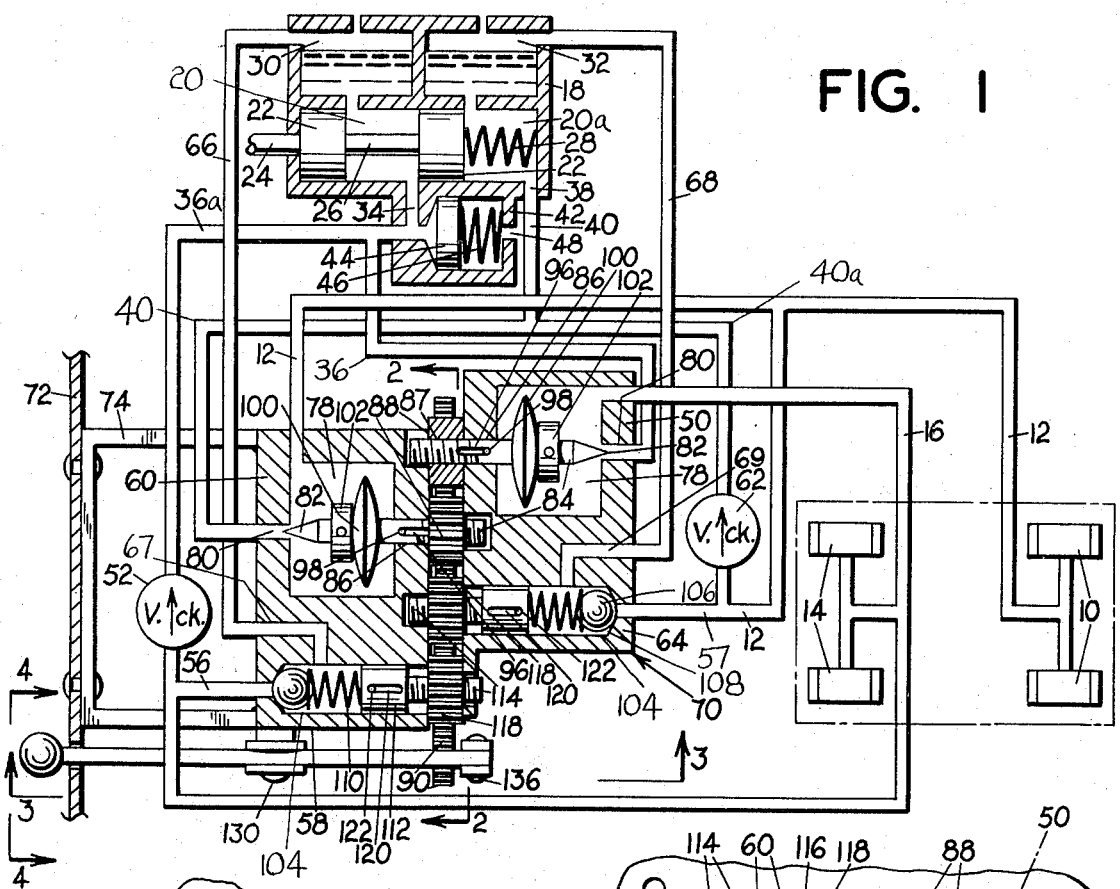
FIG. 1
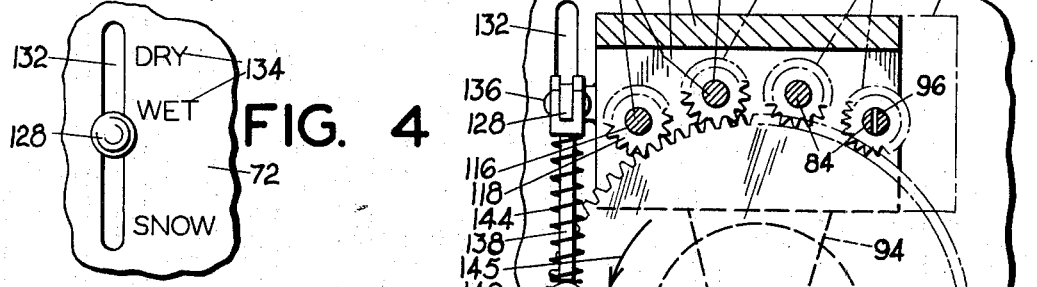
FIG. 4
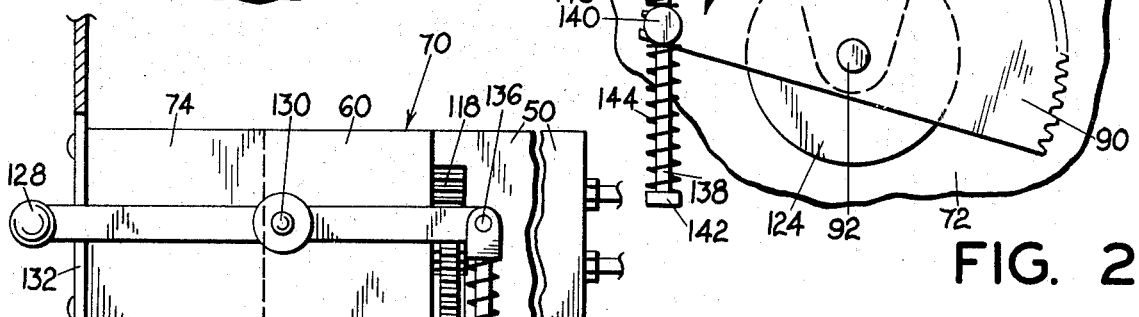
FIG. 2
FIG. 3
INVENTOR.
PAUL M. LISTER
BY Eugene M. Eckelman
ATTY.

BRAKING SYSTEM FOR VEHICLES HAVING SPEED CONTROLLED PROPORTIONAL BRAKING FOR FRONT AND REAR WHEELS

CROSS REFERENCE TO RELATED APPLICATIONS

This application is a continuation-in-part of application Ser. No. 144,156, filed May 17, 1971 for Braking System For Vehicles Having Speed Controlled Proportional Braking For Front and Rear Wheels, now abandoned.

BACKGROUND OF THE INVENTION

This invention relates to new and useful improvements in braking systems for vehicles.

It is well established that the principal braking force for vehicles is accomplished by the front wheel brakes due to the transfer of weight to the front wheels when the vehicle decelerates. Thus, the faster a vehicle is travelling the greater the braking usefulness of the front wheels becomes available, with a consequent proportionate lesser braking usefulness becoming available on the rear wheels. For this purpose front brakes are usually constructed with greater braking capacity than the rear wheels. It is also established in vehicle braking that most efficient braking can be accomplished if the wheels are not skidded since not only does braking effect diminish when the wheels skid but also control of the vehicle is lessened or entirely lost. It is furthermore established that as the vehicle tilts down in front as a result of braking, the front wheels can stand additional braking due to the weight thereon added by the decelerating inertia forces of the vehicle. In this latter regard the rear wheels should have less braking because they exert less traction on the road surface as the front of the vehicle tilts down.

Braking systems have heretofore been proposed which prevent skidding of the wheels. Devices have also been proposed which change the ratio of front to rear braking dependent upon the effective vehicle weight on the particular wheels, or to stop the admission of brake fluid to the rear wheel cylinders when the rate of the vehicle deceleration reaches a predetermined point. In addition, skid control devices have been proposed for controlling the pressure to the brakes in response to an electrical signal which indicates the occurrence of a wheel skid condition.

None of these devices, however, provide for changing brake capacity for the front and rear wheels depending upon the speed of the vehicle. Although the anti-skid devices provide for better control of the vehicle, maximum braking efficiency is not accomplished, and in those devices which control the pressure to the brakes in response to an electrical signal indicating the occurrence of a wheel skid, an on-off skid situation is present which reduces effective braking as well as effective control of the vehicle. Also, prior devices provide control as a result of initial skid conditions rather than providing control conditions beforehand, and thus complete control cannot be available.

SUMMARY OF THE INVENTION

According to the present invention and forming a primary objective thereof, a vehicle braking system is provided which makes proportional braking prior to application of the brakes available to the front and rear wheel brakes according to the speed of the vehicle.

Another object of the invention is to provide a braking system of the type described which also employs in combination adjustment means which prevents skidding of the wheels at any speed or road condition.

Another object of this invention is to provide a braking system of the type described which employs means automatically adjusting the braking force according to the deceleration rate of the vehicle, with the braking force on the front wheels being increased and the braking force on the back wheels decreased porportionately as the deceleration rate increases.

Another object of the invention is to provide a braking system of the type described which is adjustable to control the proportional braking with regard to different conditions of road surfaces, and furthermore to provide such a vehicle system which is inexpensive to manufacture and is readily applicable to existing vehicles.

Another object is to provide a braking system of the type described which includes an automatic skidding check whereby in the event of lack of traction which may tend to cause skidding of the front or rear wheels, pressure is controlled such that it is immediately reduced until the rear wheels regain traction. Pressure is then restored to the front and rear in proportion to the speed of the vehicle at actual turning speed of rear wheels.

The invention will be better understood and additional objects and advantages will become apparent from the following description which illustrates preferred forms of the device.

BRIEF DESCRIPTION OF THE DRAWINGS

FIG. 1 is a layout view, partially diagrammatic, of a first embodiment of brake system employing principles of the present invention;

FIG. 2 is an enlarged fragmentary sectional view taken on the line 2—2 of FIG. 1;

FIG. 3 is an enlarged fragmentary sectional view taken on the line 3—3 of FIG. 1;

FIG. 4 is an enlarged fragmentary elevational view taken on the line 4—4 of FIG. 1;

DETAILED DESCRIPTION OF PREFERRED EMBODIMENTS

Figure 5:
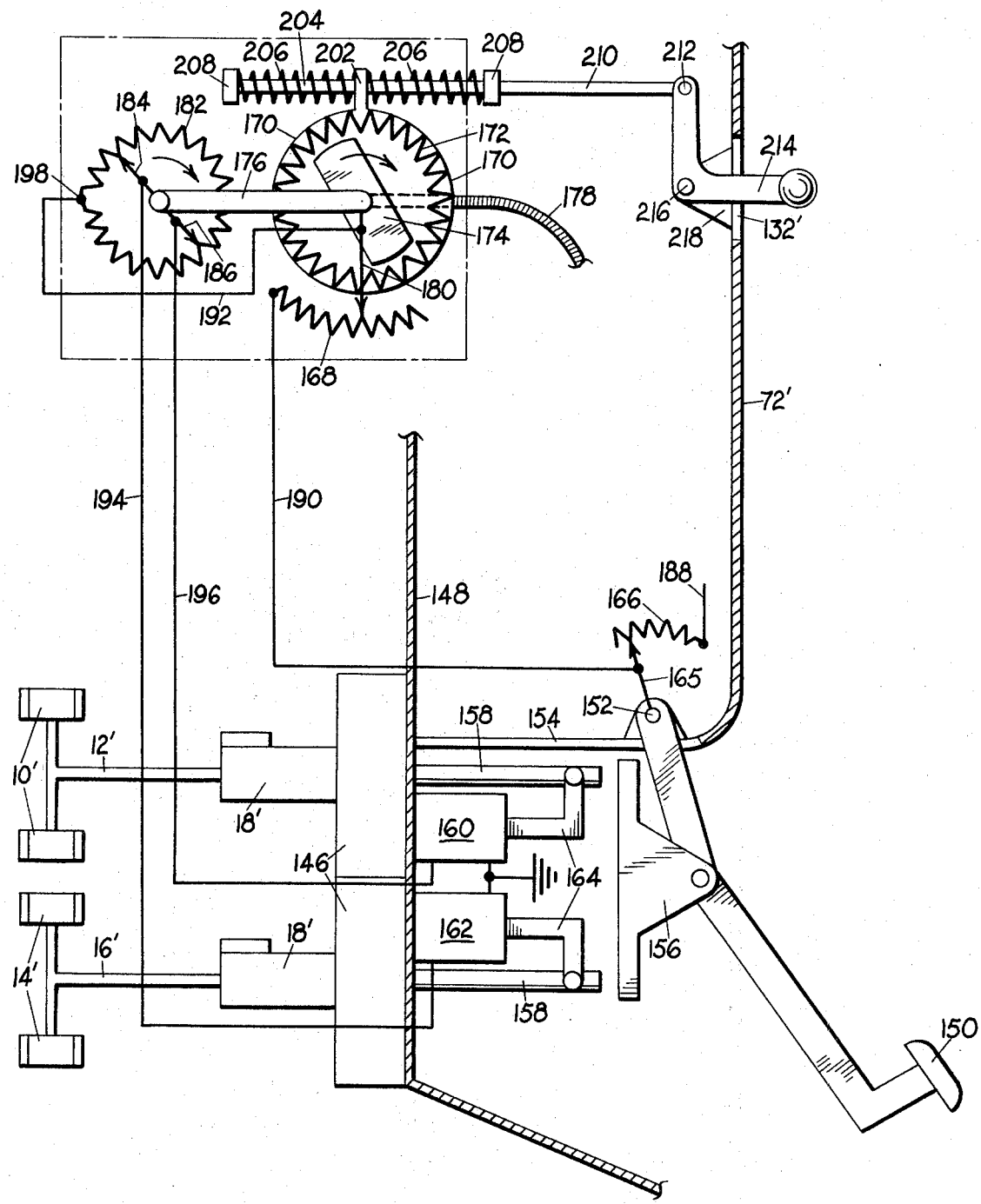
FIG. 5 is a layout view, partially diagrammatic, of a second embodiment of the invention.

Reference is first made to FIGS. 1–4 which shows a first embodiment of the invention, wherein proportional control means are fluid operated and form a part of a fluid operated braking system. The numeral 10 represents front wheel braking means such as wheel cylinders fed by fluid from a conduit 12. The numerals 14 represent rear wheel braking means such as wheel cylinders fed by a conduit 16. The system employs a master cylinder 18 which conventionally includes cylinder portions 20 and 20a in which respective plungers 22 and 22a are operated by a brake pedal actuated rod 24. The two plungers 22 are connected integrally by a rod 26 and are urged to a non-braking or rest position by spring means 28. The master cylinder includes a pair of reservoirs 30 and 32 which supply fluid respectively to cylinders 20 and 20a for individual operation of the rear and front brake cylinders, respectively. Cylinder 20 has an outlet 34 communicating with a conduit 36 which as will be more apparent hereinafter is associated with rear braking. Cylinder 20a also has an outlet 38 communicating with a conduit 40 associated with front braking. Master cylinder housing 18 includes an auxiliary cylinder 42 communicating at one end with outlet 34 and housing a plunger 44 urged toward the fluid inlet end thereof by spring means 46. The end opposite from the inlet end has a vent port 48 to allow operation of the plunger. Cylinder 42 comprises a shock absorbing cylinder which prevents damage to portions of the braking system when the brakes are rapidly applied.

Conduit 36 communicates with conduit 16 through a control valve assembly 50, and conduit 16 in addition to leading the rear brakes is connected to a conduit 36a through a check valve 52. Conduit 36a leads back into conduit 36, the check valve 52 allowing flow from conduit 16 into the conduit 36a but not in the reverse direction. Conduit 16 has a branch conduit 56 which leads to a relief valve assembly 58.

Conduit 40 communicates with conduit 12 through a control valve assembly 60, and conduit 12 in addition to leading to the front brakes is connected to a conduit 40a through a check valve 62. Conduit 40a leads back into conduit 40, the check valve 62 allowing flow from conduit 12 into conduit 40a but not in the reverse direction. Conduit 12 has a branch conduit 57 which leads to a relief valve assembly 64. A conduit 66 leads from an outlet port 67 of relief valve assembly 58 to the rear cylinder reservoir 30, and a conduit 68 leads from an outlet port 69 relief valve assembly 64 to the front cylinder reservoir 32.

Control valve assemblies 50 and 60 and relief valve assemblies 58 and 64 are suitably contained in a housing 70 which may be supported on the dashboard 72 of a vehicle, or if desired on the fire wall or any frame portion of the vehicle, by a bracket 74. It is to be understood that suitable connection between the mmaster cylinder 18 and the housing 70 is accomplished by the conduits 36, 40, 66 and 68 in a conventional manner, FIG. 1 being partially diagrammatic and not showing the fitting details.

Control valve assemblies 50 and 60 are of identical construction except that operating parts thereof are pointed in opposite directions forwardly and rearwardly of the vehicle. Each valve assembly 50 and 60 includes a chamber 78 having inlet ports or orifices 80 communicating with respective conduits 36 and 40. These ports are associated with needle-type valves 82 supported on stems 84 having slidable support through apertures 86 in walls of the chambers 78, such slidable support being fluid sealed therearound by well known means not shown. The ends of stems 86 opposite from their needle valve ends 82 are threaded and have threaded engagement 87 with axial tapped bores in respective pinion gears 88. Both gears 88 have meshing engagement with a gear segment 90, also seen in FIGS. 2 and 3, secured non-rotatably on a shaft 92 which has journaled support in a flange 94 on the housing 70.

Stems 84 are provided with slots 96 which freely receive pins 98 anchored to walls of the chambers 78. These pins prevent rotation of the stems 86, whereby upon pivotal adjustment of the gear segment 90 with its shaft 92 and consequent rotation of pinion gears 88, the respective stems are axially adjusted. In other words, upon pivotal adjustment of the gear segment 90, the pinion gears 88 rotate therewith and the threaded connections 87 between such pinion gears and the stems 84 cause the axial adjustment of the latter. The threaded arrangement of the two stems for the rear and front brakes is such that upon pivotal adjustment of the gear segment 90, the stems move in opposite directions wherein the needle valves 82 either open relative to their ports 80 or close relative to their ports 80 depending upon whether the vehicle is accelerating or decelerating. Such movement of these valves controls braking pressure to the front and rear wheel brakes through conduits 12 and 16 respectively, according to the speed of the vehicle as will be described in greater detail hereinafter.

Each of stems 84 is made of two pieces interconnected by a regulator 100 which is of a well known type that expands when subjected to pressure, thus shortening or lengthening its stem 84 according to the pressure which exists in its chamber 78. Such stems carry weights 102 on the side toward the needle valve ends 82 which as will be seen also operate to lengthen or shorten the stems through the medium of the disc members 100 but as a result of decelerating inertia forces of the vehicle, to be described in greater detail hereinafter.

Relief valve assemblies 58 and 64 are of identical construction, having chambers 104 in which ball valves 106 operate on seats 108. The ball valves operate in opposite directions, similar to the valves 82, and are normally held shut by compression springs 110 bearing between the ball valves and body members 112 slidable in the chambers 104 and having stem extensions 114 with threaded connections 116 through pinion gears 118 having threaded engagement with the gear segment 90. The operation of stems 114 is the same as for the stems 84 of the valve assemblies 50 and 60 whereby upon pivotal adjustment of the gear segment 90 the stems 114 move in opposite directions, the arrangement being such that the springs 110 increase their load on balls 106 as the speed of the vehicle increases and vice versa. The gear ratio of gears 118 and 88 on segment 90 is predetermined for positioning the stems 114 and stems 84 in suitable manner, to be described in greater detail hereinafter. Body members 112 have slots 120 which receive pins 122 anchored in walls of the chambers 104 to prevent rotation of such body member in order that the body members 112 and stems 114 will have axial adjustment upon rotation of the pinions 118.

Pivotal adjustment of the gear segment 90 is caused by the forward movement of the vehicle, and to accomplish such function, shaft 92 is connected to a fluid slip-type clutch instrument capable of rotating the gear segment 90 through partial revolution depending upon the speed of a vehicle. Such an instrument is in common use, having the internal workings of an odometer, tachometer or like instrument wherein a needle or pointer is operated through a partial revolution depending upon the speed of a shaft or the like. In the present case, however, the shaft 92 which would normally drive a needle or pointer is extended for driving the gear segment 90. Instrument 124 is driven by a flexible cable 126 from a drive shaft portion of the vehicle. The arrangement of the parts is such that as the speed of the vehicle changes, the gear segment 90 causes the working parts of valve assemblies 50 and 60 as well as the relief valve assemblies 58 and 64 to change positions, the purpose of which is to increase or decrease braking to the front and rear wheels in proportion to the speed of the vehicle.

Regulating means for setting the gear segment 90 according to different road conditions is provided. Such means comprises a lever 128 pivotally connected at 130 intermediate its ends on the housing 70. One end of the lever projects through a slot 132 in the dashboard 72 and is associated with markings 134 which designate certain road conditions such as "dry," "wet" and "snow." The other end of the lever 128 has a pivotal connection 136 with a rod 138 which passes freely through a projection 140 secured to the gear segment 90 adjacent to a peripheral portion of the latter. Rod 138 terminates at its free end in a head portion 142 and supports thereon a pair of compression springs 144 one of which is disposed between the pivot connection 136 and the projection 140 and the other of which is disposed between the said projection and the head portion 142. It is apparent that by the arrangement illustrated, the gear segment 90 will be balanced on the rod between the springs but that it may be adjusted to different set or start positions by pivotal adjustment of the lever 128.

In the operation of the present brake system, manual operation of brake pedal actuating rod 24 moves the plungers 22 and 22a forwardly to apply pressure in conduits 36 and 40. With reference first to conduit 36, fluid pressure is prevented from acting directly in line 16 because of check valve 52 but is capable of acting on rear wheel brakes 14 through control vallve assembly 50. Likewise, pressure in conduit 40 of the front wheel brakes is prevented from acting directly in line 12 because of check valve 62 but is capable of acting on front wheel brakes through control valve assembly 60.

The present valve assemblies and their adjustment means is designed to make braking power available prior to braking to the extent that as the speed of the vehicle increases, the braking effect to the front wheels increases in greater proportion than the braking effect to the rear wheels. This is accomplished by the pivoted adjustment of gear segment by the speed controlled instrument 124 in an arrangement whereby as the speed of the vehicle increases, the gear segment 90 is pivotally moved in the direction of arrow 145 in FIG. 2 and its threaded arrangement with stems 84 is such as to move the stems of valve assemblies 50 and 60 away from their ports 80 to allow greater braking pressure to the front and rear wheels proportionately. The proportional ratio to the front and rear brakes is accomplished by the gear ratio of the respective pinions 88 on the gear segment 90 such that as stated even though the braking effect to both front and rear wheels is increased with the increase in speed, the proportional braking to the front and rear may change at a different ratio to accomplish the most efficient braking efforts, all of such proportional braking being accomplished by the gear ratio between the gear segment 90 and the individual pinions 88. As the car slows down, the stems of the valve assemblies move back toward their ports to lessen braking capability of the front and rear wheels proportionately.

The effective proportional braking front and rear is determined empirically for best results. The valves may be set and gear ratio is such that at 20 miles per hour, for example, the braking may be 45 percent in the rear and 55 percent in the front. At 40 miles per hour it may be 40 percent rear and 60 percent front, at 60 miles per hour it may be 25 percent rear and 75 percent front, the greater the speed, the greater the pressure to the front proportionately. In addition to the proportional braking, the valves are set so that at all speeds the activating pressure through the valves to the brakes is such as to prevent skidding of the wheels. More particularly, any excess pressure which the operator may tend to apply is restricted from the lines to the brakes by movement of valve point 82 toward its orifice by expansion of regulators 100 as a result of the excess pressure thus preventing said excess pressure to cause wheel skidding.

Adjustment according to road surface is manually set by lever 128. Movement of this lever pivots the gear segment 90 to different normal or rest positions, and in such positioning sets the stems of valve assemblies 50 and 60 accordingly for adjusted operation controlled by the speed of the vehicle. For example, when the vehicle is operating on dry pavement the lever is moved upwardly as viewed in FIGS. 3 and 4. This adjustment re-positions gear segment 90 at a counterclockwise position to position the stem of front wheel control valve assembly 60 to a maximum open setting and to position the stem of rear wheel control valve assembly 50 also to a maximum open setting. In the wet or snow settings of lever 128 the stems of both valve assemblies 50 and 60 are held closer to their ports to restrict braking forces. In all settings of the lever 128, the pressures are empirically determined such that the wheels will not skid under any condition. In the snow or ice setting, the braking ratio is fixed such that the rear brakes may at certain speeds even have greater braking than the front brakes.

Another feature in the operation of applicant's braking system comprises the use of the regulators 100 and the weights 102. As stated hereinbefore, valve stems 84 are disposed longitudinally of the vehicle with the stem of the rear valve assembly 50 pointing forwardly toward its port 80 and the stem of the front valve assembly 60 pointing rearwardly toward its port 80. By means of this arrangement, the braking or slowing inertia force of the vehicle physically compresses the regulator 100 of the valve assembly 50 to move its valve point toward its port 80 to reduce braking force to the rear brakes and at the same time the regulator 100 of the valve assembly 60 is compressed to pull its valve point away from its port 80 and allow greater braking force to the front brakes. Operation of the regulator members 100 is accomplished by their respective weights 102 to automatically increase front wheel braking and to decrease rear wheel braking while the vehicle is slowing abruptly. Such additional braking is very effective since the downward tilted position of the car in a forward direction and consequent added weight on the front wheels allows a much greater braking force to be effectively applied thereto while on the other hand in this same condition less weight exists on the rear wheels and consequently less braking force can be applied thereto.

The relief valves 58 and 64 allow escape of fluid pressure above that desired in conduits 16 and 12. That is, the spring force which holds the balls seated and the axial movement of body members 112 by gear segment 90 are predetermined so that the desired pressure is applied to the brakes also to insure that the wheels will not skid. As the vehicle slows but the brakes are still applied orifice, the same or greater force, the stems 114 are operated by gear segment 90 through pinions 118 to reduce the spring pressure and cause the force to the brakes automatically to reduce the excessive force which exists in valve chambers 78 as a result of the slowing speed of the vehicle. The excess fluid flows to the reservoirs 30 and 32 through the relief valves and conduits 66 and 68. As stated hereinbefore, any excess pressure which the operator may tend to apply is restricted from the lines to the brakes by movement of valve point 82 toward its orifice by expansion of regulators 100. When the brake pedal is released, fluid pressure in the lines can bleed off fast through check valves 52 and 62.

FIG. 5 illustrates a second embodiment of the invention wherein ratio braking control to the front and rear wheels is accomplished electrically. In this embodiment, front wheel brakes are designated by the numeral 10' and are fed hydraulically from a conduit 12'. The rear wheel brakes are designated by the numeral 14' and are fed hydraulically from a conduit 16'. Power to the two conduits 12' and 16' is supplied by individual master cylinders 18' and power means 146 mounted on a suitable supporting wall 148 such as a fire wall of the vehicle. A brake pedal 150 is, according to conventional construction, suspended from a pivot 152 on a vehicle frame portion 154 and has an actuating foot 156 pivotally connected thereto and adapted for engagement with rods 158 leading to the respective power units 146. Forming a part of the present invention, the actuating foot 156 is spaced from the rods 158 so that some travel is present during which time electrical control of the power units 146 from apparatus of the present invention takes place, as will be described hereinafter. Rods 158 are disposed, however, for operation mechanically by the actuating foot 156 so that in the event that the electrical system of the invention fails, mechanical operation of the power units is avaiable by a greater than normal movement of the brake pedal. For this purpose, the rods 158 extend into the power units 146 in a well known manner.

The present system includes a pair of servo-motors 160 and 162 associated with the front and rear wheel brakes 10' and 14', respectively, and each having an arm 164 connected to respective rods 158 of the front and rear wheel brakes. The output of the two servo-motors in proportionate relation is accomplished by electrical means now to be described.

Brake pedal 150 is connected to a contact arm 165 of a rheostat 166, the arrangement being such that as the brake pedal is depressed a greater electric potential is supplied to electrical control means for the brakes, as will be more apparent hereinafter.

A second rheostat 168 is associated with an inductance-type instrument 170 such as an electrically operated odometer. The instrument is of conventional construction to the extent that it utilizes a winding 172, an armature 174 on a shaft 176, and a drive cable 178 which leads to the drive train of a vehicle similar to a speedometer cable, whereby rotation of the armature and operation of the odometer-like instrument is directly related to the speed of the vehicle.

Shaft 176 operates an arm 180 which comprises the contact arm of rheostat 168 in an arrangement such that the faster that the vehicle is travelling the greater will the potential be to brake operating means which as will be better understood hereinafter comprise the servo-motors 160 and 162.

Shaft 176 extends from the instrument 170 and operates another rheostat 182 the resistance portion of which is circular. This rheostat has a pair of oppositely extending contact arms 184 and 186 secured to and operated by shaft 176 so as to assume various positions according to the speed of the vehicle, and the arrangement is such that upon increased speed of the vehicle, arms 184 and 186 are adjusted in the rheostat to increase the potential to the servo-motors 160 and 162 and of course upon decreased speed the arms are adjusted to decrease the potential to the servo-motors.

The electrical supply system comprises an inlet line 188 to the rheostat 166 and a connecting line 190 between the arm 165 of rheostast 166 and the tap-in end of rheostat 168. A line 192 is connected between the arm 180 of rheostat 168 and the tap-in point of rheostat 182. Lead lines 194 and 196 extend respectively between arm 184 and servomotor 162 and between arm 186 and servo-motor 160. It is to be understood that the arms of the various rheostats are electrically conductive in a well known manner and various other parts of the rheostat are electrically conductive or insulative as necessary.

Line 192 is tapped into the rheostat 182 selectively such that as the speed of the vehicle increases and arm 186 moves closer to the tap point 198, it allows a greater potential to go to the front wheel brake operating servo-motor 160. At the same time, arm 184 moves away from the tap point 198 to decrease the potential to rear wheel brake operating servo-motor 162. It is apparent that as the speed of the vehicle varies the braking to the front and rear wheels is proportionate with greater braking going to the front wheels and proportionately less braking going to the rear wheels as the speed increases. The controlled power to the brakes is predetermined to apply maximum braking without skidding the wheels.

The first rheostat 166 thus controls the amount of braking as determined by the travel of the brake pedal, and rheostat 168 in addition controls the extent of braking determined by the speed of the vehicle. Furthermore, rheostat 182 controls proportional braking front and rear. By means of these controls, most effective braking of the vehicle can be accomplished.

Means are provided for adjusting the normal or rest position arm 180 in rheostat 168 as determined by road conditions. Such comprises a tab finger 202 integral with the housing of instrument 170 and slidably receiving a rod 204 carrying a pair of springs 206. Springs 206 are disposed on opposite sides of the tab finger 202 and are abutted between such tab finger and opposite end enlargements 208. Rod 204 has an extension 210 at one end pivotally connected at 212 with an angled lever 214. Lever 214 has pivotal support 216 on a bracket 218 integrated with the dashboard 72'.

By operating the lever 214 to different pivotal positions the pivotal set position of instrument 170 is varied. Such positioning of the housing re-positions the contact arm 180 in its normal or rest position in the rheostat 168 and the potential output through rheostat 168 is accordingly changed for all speeds of the vehicle. That is, by adjusting the lever 214 in a clockwise direction, the housing 170 is likewise adjusted in a clockwise direction to position its arm 180 closer to the tap point into the solenoid 168 so that greater braking force is applied to the brake operating servo-motors than in a normal setting. Movement of the lever 214 in a counterclockwise direction positions the arm 180 farther from the tap point of the solenoid to provide less braking potential. The lever 214 may be associated with markings, not shown, similar to that illustrated in FIG. 4.

Figure 6:
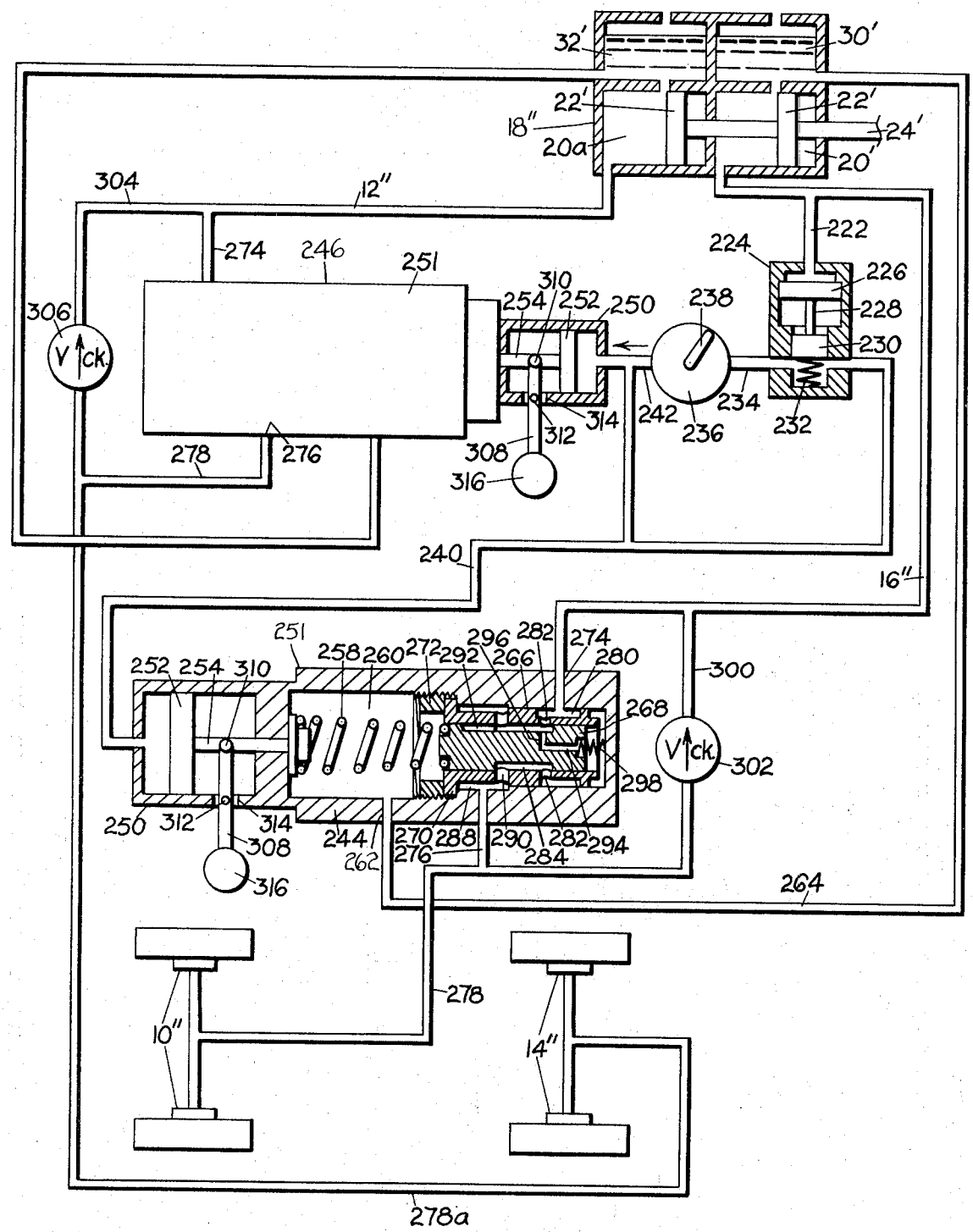
FIG. 6 is a layout view, also partly diagrammatic, of still another embodiment of the invention.

FIG. 6 illustrates another embodiment of the invention. This embodiment, similar to the other embodiments, employs ratio braking such that greater braking is made available to the front wheels. Also, the braking to the front wheels is proportionately greater than to the rear wheels, particularly under fast stop or panic conditions. The numeral 10'' designates the front wheel brakes and the numeral 14'' designates the rear wheel brakes. Braking pressure to the front and rear wheels is supplied by a double master cylinder 18'' having cylinder portions 20' and 20a' in which plungers 22' are operated by a brake pedal actuated rod 24'. The master cylinder includes reservoirs 30' and 32' for cylinder portions 20' and 20a', respectively. An output conduit 16'' leads from portion 20' of the master cylinder for operating the front wheel brakes through regulating means to be described and an output conduit 12'' leads from the portion 20a' of the master cylinder for operating the rear wheel brakes also through regulating means to be described.

A conduit 222 leads from conduit 16'' adjacent to the master cylinder into a fluid operated cylinder 224 having a plunger 226 therein This plunger has a piston rod 228 in turn connected to a valve 230 acting against a spring 232 abutted against an end of cylinder 224. The valve 230 controls the flow through a conduit 234 comprising a by-pass for a pump 236 operated by a shaft 238 driven by the drive shaft of the vehicle. Connection of the pump to the drive shaft of the vehicle may be accomplished in any well known manner. In fact, connection need not be to the drive shaft but necessarily the pump, according to the invention, must be driven so as to have an output comprising a straight line function of the speed of the vehicle. Conduit 234 connects the output side of the pump to the input side and is arranged such that when the valve 230 is open the pump will merely circulate fluid. With the valve 232 closed, however, the circulation in the conduit 234 is shut off and the pump then applies pressure to a pair of conduits 240 and 242 which are connected into conduit 234 on the output side of the pump. These two conduits lead to respective regulators 244 and 246, now to be described, controlling braking of the front and rear wheels, respectively.

Each of the regulators 244 and 246 has the same construction. It is to be noted, however, that these regulators are longitudinally reversed so as to face in opposite directions, the purpose of which will be described hereinafter. Since such regulators are identical, only one, namely the regulator 244 for the front brakes, will be shown and described in detail. Each includes a cylinder 250 mounted on one end of its housing 251, and these cylinders enclose a plunger 252 therein. Conduits 240 and 242 lead to the respective cylinders 250 and are connected into the cylinders at the ends opposite the regulator. Cylinder 250 for the front wheel regulator is larger than the cylinder 250 for the rear wheel regulator. A piston rod 254 extends slidably into one end of the housing 251 for the regulators, and the free end thereof abuts against a compression spring 258 disposed in relief chamber 260 in the valve housing. Relief chamber 260 has an outlet port 262 communicating with the reservoir 30' of the master cylinder by means of a conduit 264.

Housing 251 has a chamber 266 leading from relief chamber 260, and slidably mounted in this chamber is a plunger type valve body 268 against which the spring 258 bears. This valve body has slidable support in a sleeve 270 in the chamber 266, and such sleeve is held in place for assembly by a rear keeper 272 such as a nut. Reference to the front and rear of regulator valves 244 and 246 relates to their structure and not to the front and rear of the vehicle, the front of each being the direction away from the respective fluid cylinder 250. Each housing 251 has an inlet port 274 into which the respective output conduits 16'' and 12'' are connected. Each housing 251 also has an outlet or regulated port 276 in communication with the respective wheel cylinders by conduits 278. Outlet port 276 is staggered longitudinally relative to inlet port 274 of the housings and controlled braking pressure applied from the master cylinder is determined by the position of valve body 268 in that it controls the volume of flow of brake fluid from inlet port 274 to outlet port 276. Sleeve 270 has an outer peripheral groove 280 in the area of and communicating with the inlet port 274. This sleeve also has a plurality of radial ports 282 which communicate with the groove 280 and are arranged to establish communication between such groove and a peripheral groove 284 in the valve body 268.

Chamber 266 has a second peripheral groove 288 in the area of and communicating with outlet port 276. This latter groove is in communication at all times with groove 284 in the valve plunger by a plurality of radial ports 290 in the sleeve 270. Groove 284 has a slot extension 292 extending rearwardly and arranged for communication with the relief chamber 260 upon a selected rearward or retracting movement of the valve body 268.

A bore 294 extends inwardly from the front end of valve body 268 and communicates with peripheral groove 284 by means of a port 296 for establishing communication between the inlet port 274 and the front of the valve body 268. A small compression spring 298 is disposed between the front of the valve body and the front defining wall of housing 251 and serves to cushion front terminal movement of the valve body and also to prevent bottoming of the valve body in the chamber 266.

A conduit 300 extends between conduit 16'' and the conduit 278 extending to the front brakes and has a check valve 302 therein allowing one way flow of brake fluid only, namely, in the return direction from the front brakes to the master cylinder. A conduit 304 is connected between conduit 12'' and the conduit 278 extending to the rear brakes and has a check valve 306 therein similarly allowing one way flow from the rear brake to the master cylinder.

For the purpose of describing the operation of the embodiment of FIG. 6, it will be noted that the pressure from the master cylinder to the front and rear wheel brakes passes through the regulating valves 244 and 246, respectively. Also, as was described, pressure from the master cylinder simultaneously operates the valve 230 which in turn controls the operation of pump 236. The pump, being driven from the drive shaft of the vehicle, has an output related directly to the speed of the vehicle. The pump 236 will merely circulate its output through conduit 234 until such time that the valve 230 closes, namely, at all times that the brakes are not actuated. When the brakes are applied, however, valve 230 closes off conduit 234, and the output pressure from the pump will act on the plungers 252 of each regulator 244 and 246. It is apparent that the greater the speed of the automobile, the greater will be the output of the pump and similarly the greater will be the resisting force against movement of the valve bodies 268 of the regulators rearwardly.

The structural arrangement and operative function of the regulating valves is predetermined so as to provide proper braking functions for the automobile. That is, the selected dimensions of the various ports and grooves in the valve body and valve housing, together with the force of spring 258 and the influence of braking pressure on the valve body 268, is pre-selected so that said proper braking is accomplished. Also, the system is such that the faster that the vehicle travels, the greater will be the braking allowed to the wheel cylinders. In addition, a greater braking effect is allowed to the front wheels in proportion to the braking allowed to the rear wheels during braking and particularly during fast stop conditions at high speed, such proportional braking being accomplished by the difference in size of plungers 252.

To explain in greater detail the operation of the system of FIG. 6, it will be assumed first that the vehicle is traveling at a very slow rate such as, for example, 15 to 20 miles per hour. As the vehicle travels, the pummp 236 is put in operation by its drive connection with the drive shaft of the vehicle. Without the brakes being applied, however, the output of the pump merely circulates freely back to the input side through conduit 234. If the brakes are applied, the output of the pump is transferred to the conduits 240 and 242 leading to the cylinders 250 which causes the plungers 252 to resist rearward movement of the respective valve bodies 268 of the regulating valves. Also, when the brakes are applied, fluid pressure from the master cylinder flows from inlet 274 of each regulating valve to the outlet 276 through groove 280, ports 282, groove 284, ports 290, and groove 288. Since the brake pressure to stop the vehicle at such a slow speed is quite low, the fluid pressure which is admitted to the front of valve body 268 through port 296 and bore 294 does not produce any appreciable movement of the valve body 268. Free flow will thus exist through the regulating valves for unregulated braking.

As the speed of the vehicle increases, however, it is desired that the regulator valves control the maximum braking to each cylinder so that the operator can maintain good control. Such control, as is well known, is just before skid point. As the speed increases, it is to be noted that the output pressure of the pump 236 increases and the forward pressure exerted on the valve bodies 268 by plungers 252 also increases. Assuming then that the vehicle is traveling at a speed at which regulated braking is desired, namely, a braking which will not allow locking of the wheels, the valve bodies 268 are driven rearward to reduce excess pressure. Rearward driving movement of the valve bodies is accomplished by fluid pressure admitted to the front of the valve bodies through port 296 and bore 294 which is sufficient to overcome pressure from plungers 252, and the restricted braking may comprise a partial retracted movement of the valve bodies to restrict pressure allowed through ports 282 or a complete retracted movement where no pressure is allowed through the regulator by shut-off of ports 282 from groove 280. With the ports 282 closed, further braking cannot thus be effected, and with the proper settings as explained, the vehicle is at its best braking notwithstanding overreacting efforts of the operator. The force of braking to the wheels is thus controlled by the speed of the vehicle, with the differential in braking to the front and rear wheels being accomplished by the force exerted by the different size plungers 252.

A cut-off or restriction of pressure to the brakes through ports 282 for regulated braking will continue until such time that the opertor relieves some or all of the pressure on the brake pedal. As stated, even though the operator is in a panic condition and does not take his foot off the brake, proper braking will be accomplished to stop the vehicle. That is, as the vehicle slows down, the pressure on the plungers 252 will lessen because of lesser output of pump 238 which of course means that the influence by plungers 252 on the valve bodies 268 also lessens. This will allow the valve bodies to retract farther, and if excessive braking by the operator still persists, braking pressure to the wheels will lessen by relief of pressure from the brake in the reverse direction through outlet port 276, groove 288, ports 290, groove 284 and slot 292 which at this time will be in communication with relief chamber 260. As soon as the pressure from plunger 252 overcomes the brake line pressure at the wheels, however, the relief will be discontinued since the valve body will be moved forwardly under the action of the plunger 252. This relief and return movement will occur alternately as long as necessary to maintain the necessary braking pressure. Of course, if the operator is sufficiently experienced to let off on the brakes as the vehicle slows in a fast stop condition, controlled braking is again regulated through ports 282, and relief does not occur through chamber 260. This latter regulated braking would not occur very frequently because very few operators have such capabilities in fast stop or panic conditions. The best braking conditions for panic stop are thus accomplished automatically even though the operator exerts a full force to the brake pedal.

The plungers 252 of each regulating valve 244 and 256 are each associated with a lever 308 which serves to assist the said plungers in their proportioning of the braking to the front and rear wheels in direct relation to the speed of the vehicle. That is, as stated hereinbefore, it is desired that the front wheels have a proportionately greater amount of the braking power as the speed increases because of the transfer of weight when the vehicle decelerates, and the mass relationship of the levers 308 accomplishes this. Each lever has a pivot connection 310 at its inner end to the piston rod 254 forward of the plunger and has a fulcrum connection to a cross pin 312 in a slot 314 in the side wall of cylinder 250. The outer ends of the levers terminate in a weight 316. To demonstrate the function of the levers 308, it will be assumed that the vehicle is travelling in the forward direction as shown in FIG. 6, namely, to the left. As pointed out hereinbefore, the regulators are disposed in longitudinally reversed positions, with the cylinder 250 for the front wheel regulator 244 being at the front with relation to the direction of travel of the vehicle and the cylinder 250 for the rear wheel regulator 246 being at the rear. Thus, as the vehicle is braked, forward inertia causes the weight 316 acting on the plunger 252 associated with the front wheel regulator 244 to resist retracting movement of the associated valve body 268 and a greater braking pressure is thus necessary through the regulator before shutting it off. On the other hand, the weight 316 acting on the plunger 252 associated with the rear wheel regulator 246 assists movement of its valve body 268 and allows quicker restricting or shut down movement of braking of the rear wheels. If desired, the weights associated with the levers for the front and rear brakes may be of different masses. The levers 308 being disposed forward of their respective plungers extend through slots 314 without the necessity of sealing.

Thus, in addition to the regulation of braking to the front and rear wheels as accomplished by the different size plungers 252, additional regulation is accomplished by the use of the weighted levers 308. Although the different size of the plungers 252 will provide some of the extra braking desired for the front wheels, most of the braking ratio difference between front and rear occurs during deceleration as a result of the weights 316. That is, the weight 316 for the front brake regulator 244 pivots forwardly upon deceleration, thus resisting movement of its associated plunger 252 from progressing rearwardly as rapidly and allowing a greater pressure to pass through said regulator and increase the amount of brake pressure that valve 268 associated with the front wheels will allow to the latter. On the other hand the weight 316 for the rear brake regulator 246 pivots forwardly but since the regulators are reversed relative to each other, this weight will assist movement of associated plunger 252 to decrease the amount of brake pressure that valve 268 associated with the rear wheels will allow to the latter. The regulation accomplishhed by the force of pump 236, the effect of plungers 252 on their respective valve bodies 268, the force of springs 258, and the leverage accomplished by levers 308, are empirically established such that the exact proportional braking to the front and rear wheels sets up ideal braking conditions on all wheels, namely, a braking just short of the skid point. The relationship may require different settings where disc brakes are used.

The function of the check valves 302 and 306 is to allow any excess pressure in the brake cylinder to bleed off. Thus, the pressure in the brake line will never become greater than the unregulated pressure.

Having thus described my invention, I claim:

1. A brake system for vehicles comprising front and rear fluid operated braking means; individual brake applying means for said front and rear braking means operated by a brake pedal; conduit means communicating between said brake applying means and said braking means; and brake control means for each of said front and rear braking means; said brake control means including valves arranged to control flow of the brake applying fluid to the front and rear brakes, adjustment means operatively connected to said valves arranged to influence operation of said valves and provide proportionate braking to the front and rear wheels, and drive means connected to said adjustment means arranged to be connected to the drive shaft portion of a vehicle for positioning said adjustment means so that as the speed of the vehicle increases, greater braking force is made available to the front and rear wheel brakes prior to braking and in a proportion.

2. The brake system of claim 1 wherein said adjustment means includes a fluid operated cylinder having a plunger operatively connected to said valves and said drive means includes a pump for operating said plunger, the plunger associated with the front brakes being larger than the plunger for the rear brakes to provide the greater braking force to the front wheels.

3. The brake system of claim 2 wherein said adjustment means includes a gear connection between said drive means and said valves.

4. The brake system of claim 2 including regulating mechanism for said brake control means arranged to regulate the over-all braking force according to road conditions so as to prevent locking of the wheels under substantially any road condition.

5. The brake system of claim 1 wherein said adjustment means includes a fluid operated cylinder having a plunger operatively connected to said valves, said drive meanns including a pump for operating said plunger, and control means for said pump arranged to operatively connect said pump to said fluid operated cylinder only during a braking operation.

6. The brake system of claim 1 wherein said adjustment means includes a weighted lever operatively connected to said plunger and arranged to affect operation of said plunger by deceleration forces of the vehicle.

7. The braking system of claim 1 wherein said brake control means includes auxiliary control means operated by deceleration forces of the vehicle and arranged proportionately to make additional braking available to the front brakes and less braking available to the rear brakes with increased deceleration rate of the vehicle.

* * * * *